LA VERNE W. NOYES.
BAR SHAPING TOOL.
APPLICATION FILED FEB. 18, 1910.
1,051,752.
Patented Jan. 28, 1913.
2 SHEETS—SHEET 2.
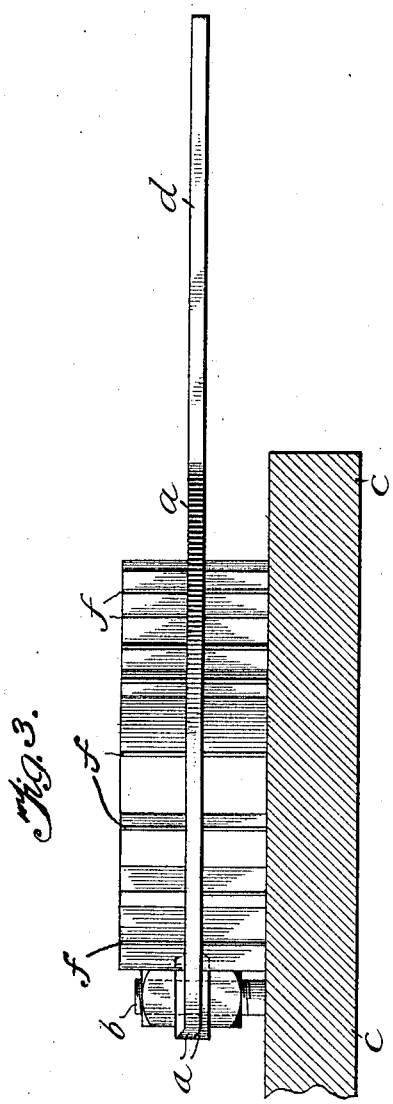
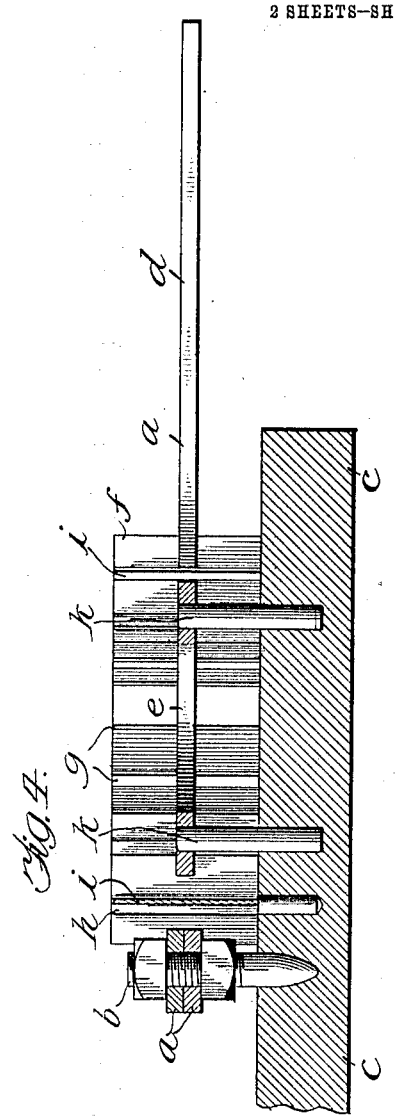

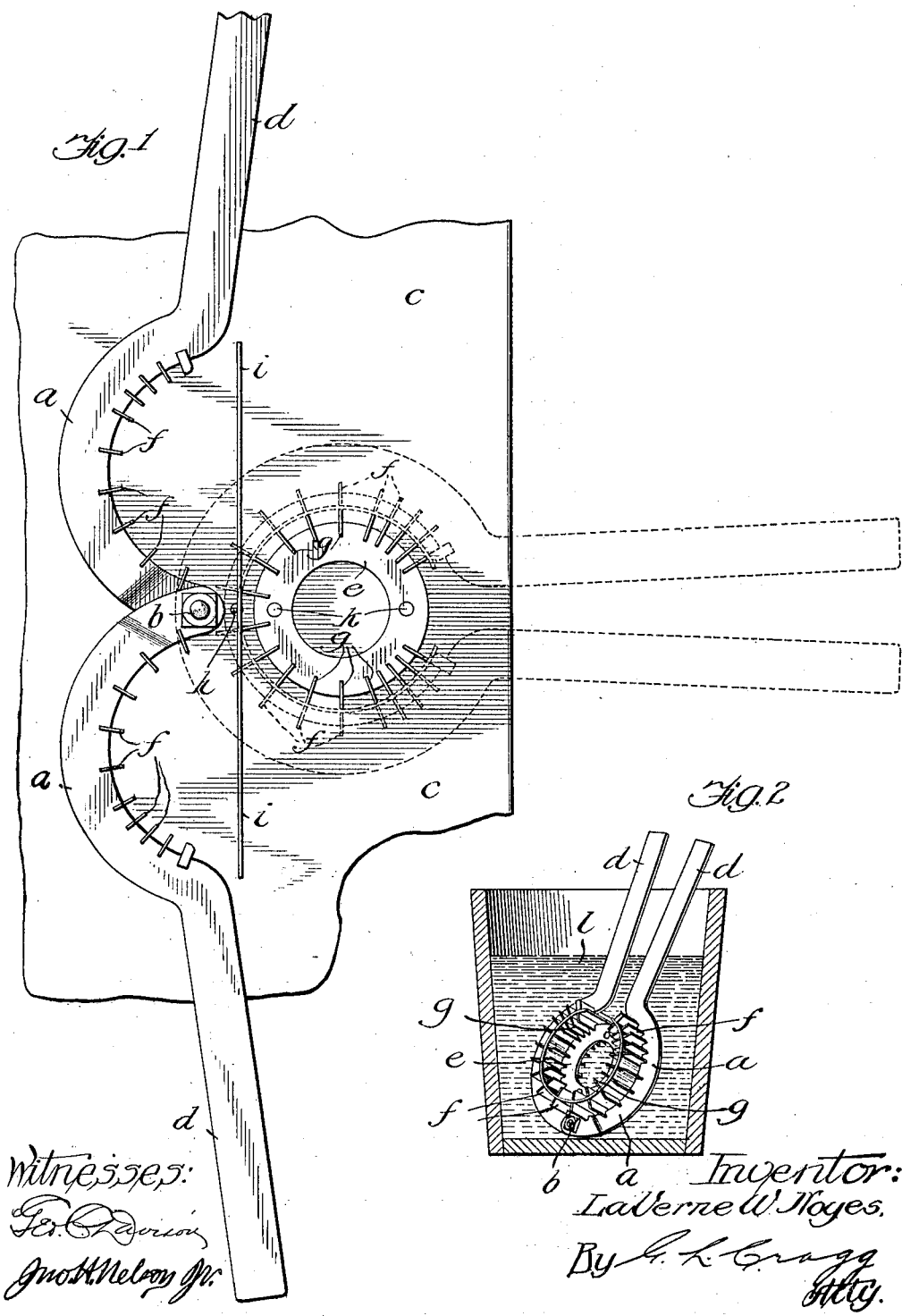

UNITED STATES PATENT OFFICE.

LA VERNE W. NOYES, OF CHICAGO, ILLINOIS.

BAR-SHAPING TOOL.

1,051,752.  Specification of Letters Patent.  Patented Jan. 28, 1913.

Application filed February 18, 1910. Serial No. 544,642.

*To all whom it may concern:*

Be it known that I, LA VERNE W. NOYES, citizen of the United States, residing at Chicago, in the county of Cook and State of Illinois, have invented a certain new and useful Improvement in Bar-Shaping Tools, of which the following is a full, clear, concise, and exact description, reference being had to the acompanying drawings, forming a part of this specification.

My invention relates to a device that serves to shape strip or bar metal.

The apparatus of my invention is of particular advantage in the preparation of bar or strip iron for permanent magnetization, as by means of my invention one heating will be sufficient to enable the iron to be shaped and hardened.

As my invention is of great utility in the shaping and tempering or hardening of iron bars or strips preparatory to the electromagnetization thereof to constitute permanent magnets, I will more specifically illustrate and describe my invention as employed in connection with the shaping and treatment of strip or bar iron for the purpose stated, though I do not wish to be limited to any specific embodiment of the different features of my invention, nor to any definite shape in cross section of the bars operated upon, though bars that are rectangular in cross section are preferred in the formation of permanent magnets.

In practising my invention, I heat the bar of iron that is to be shaped and hardened to a heat that will enable the iron first to be shaped and thereafter hardened, subject the iron bar to the action of a shaping tool, and while being held in shape by the shaping tool, immerse it in the selected hardening fluid, preferably water. The time occupied in shaping the bar is so short that the loss in temperature that occurs during the shaping process is negligible, one heating therefore being available for the double purpose of shaping and hardening. Hitherto, it has been the practice to heat the iron once for shaping and allow it to cool after shaping, and thereafter heat the iron again for hardening or tempering purposes. In no case, so far as I know, has the iron been subjected to the action of the hardening fluid while held in shape by a shaping tool. By the process set forth, two important advantages are gained, namely: the iron is not permitted to change its shape before it is hardened, owing to the restraining influence of the shaping tool, and a second heating to prepare the shaped bar for tempering or hardening is not required, thereby effecting economy in operation and eliminating the effects of a second heating which are objectionable in the making of permanent magnets.

The shaping or forming tool of my invention is preferably one in which the shaping faces have restricted areas of contact with the metal being shaped, ample clearance being afforded for the access of cooling fluid to the heated metal, whereby the metal, after being shaped, may quickly be cooled while being restrained from changing its shape by the forming tool.

I will explain my invention more fully by reference to the accompanying drawings showing the preferred practice thereof and in which—

Figure 1 is a plan view of the forming or shaping tool, the full lines indicating the position of the parts before the metal is received by the tool, while the dotted lines indicate the positions of the parts of the tool that are occupied after the tool has formed or shaped the metal; Fig. 2 is a perspective view of the tool immersed, together with the iron bar in its grip, within a body of cooling fluid which also preferably hardens the metal; Fig. 3 is a side view of the structure; and Fig. 4 is a side elevation of the inner face of one half of the structure.

Like parts are indicated by similar characters of reference throughout the different figures.

The preferred form of tool is portable and includes two pivotally connected presser jaws $a$ $a$ united by a pivotal bolt $b$ that is extended a sufficient distance below the jaws to be removably located within a correspondingly shaped vertically disposed recess located in a work bench top $c$ that is preferably made of metal. The jaws are desirably manually operated, in which case I provide extensions $d$ thereof that constitute handles. The jaws themselves are of an internal contour corresponding to the external contour which is to be imparted to the bars by means of the tool, this contour being substantially circular when the jaws are closed, as indicated by the dotted lines in Fig. 1. A forming body $e$ is so positioned upon the bench top as to be inclosed by the jaws when drawn together, said forming body and jaws simultaneously engaging the bar interposed between the jaws and forming body. The jaws are provided with a plurality of insetting projections *f* while the forming body is provided with a plurality of outsetting projections *g*, the projections upon the forming body desirably being in radial alinement each with a projection *f*. The projections *f* and *g* are desirably made of very hard steel, suitable for contact with heated iron, and are driven into notches in the supporting bodies *a* and *e*. The jaws *a* and the forming body *e* together with the projecting plates *f* and *g* are galvanized. The outer edges of the plates *f* and *g* are substantially straight and are perpendicular to the planes of the jaws and forming body whereby the plates may have extended contact with the bar to be shaped.

The opposing end faces of the plates or projections *f* and *g* constitute the real forming surfaces of the jaws *a* and the forming body *e*, ample clear spaces intervening between the bodies that support said plates, and between adjacent radially alined plates whereby ample circulating space is afforded for comparatively large bodies of cooling air or liquid to cause the quick cooling of the metal brought into shape by the jaws *a* and the forming body toward which they are moved. The projections or plates *f* and *g* have vertical dimensions that are desirably much in excess of the vertical dimensions of the plate supporting portions of the jaws and forming body, particularly where the forming tool is employed for shaping strip iron for use in the formation of permanent magnets. In other words, each of the projections extends in two relatively transverse directions from the portion of the structure supporting the same. In this way greater access of the cooling medium to the hot metal is afforded. In the preferred embodiment of the invention the plate supporting portions of the jaws *a* and forming body *e* are disposed midway between the tops and bottoms of the plates. The plates at the free ends of the jaws are desirably much stouter than the remainder which are preferably made as thin as illustrated when the strip metal to be shaped is thin, so as to minimize the areas of contact that said plates have with the metal being shaped, a sufficient number of the plates being employed properly to force the heated metal into the predetermined shape.

A gage pin *h* is disposed upon the work bench top *c* in alinement with the centers of the pivot *b* and forming body *e*, a marked part of the heated metal body *i* being brought into register with said gage pin when the jaws *a* are spread apart. As the tool is illustrated in connection with the process of preparing magnet iron, the strip iron is cut into suitable lengths and the gage marks are desirably located opposite the middles of these lengths, which are thereafter heated and located, one at a time in proper relation with the gage pin when the jaws are spread apart, whereafter the jaws are brought to their closed position illustrated by the dotted lines in Fig. 1 to impart the predetermined shape, preferably circular, to the iron strip.

When it is desired to speed the cooling of the formed metal or to temper or harden it as well as to speed the cooling, and at the same time to prevent the modification of the shape of the metal during its tempering or rapid cooling, I make the forming tool portable, to which end the bolt *b* may be lifted from its socket and the pins *k* that position the forming body *e* also may be lifted from receiving sockets in the bench top, said pins being removably located in the bench top for this purpose. When a heated bar has been shaped the forming tool with the iron bar gripped thereby is lifted bodily from the bench top and plunged into a body of water *l* (Fig. 2) that serves both to cool and harden the iron, the time occupied in transferring the iron from the heating furnace to the tool and transferring it with the tool to the body of water being so short, that one heating may readily suffice for shaping and hardening the iron. The jaws and forming body are firmly held in engagement with the iron shaped thereby so that the shape of the iron cannot be materially modified during the cooling and hardening process, results that are highly important as hitherto pointed out. After the iron has been sufficiently cooled, the tool is restored to the work bench top, the elements *k* and *b* being reinserted in the respective sockets in the bench top provided for receiving the same, whereafter the jaws are opened to permit of the shaping, cooling and hardening of the next iron bar in the manner which has been described.

While I have herein shown and particularly described the preferred form of my invention, I do not wish to be limited to the precise details set forth, as changes may readily be made without departing from the spirit of my invention.

Having thus described my invention, I claim as new and desire to secure by Letters Patent the following:—

1. A bar shaping tool including two pivotally united presser jaws; a forming body; plates carried by the presser jaws and forming body, these plates projecting from said jaws and forming body toward each other and projecting laterally of the planes of the jaws and forming body, the outer edges of said plates being substantially straight and perpendicular to the planes of the jaws and forming body whereby they may have extended contact with the bar to be shaped; and a support for the presser jaws and forming body, the support, the presser jaw structure, and the forming body being provided with structural formations whereby the presser jaw structure and forming body may be held in relation to the support while a bar is being shaped and may be removed from the support with the bar held in position between the presser jaws and forming body.

2. A bar shaping tool including two pivotally united presser jaws; a forming body; plates carried by the presser jaws and forming body, these plates projecting from said jaws and forming body toward each other and projecting laterally of the planes of the jaws and forming body; and a support for the presser jaws and forming body, the support, the presser jaw structure, and the forming body being provided with structural formations whereby the presser jaw structure and forming body may be held in relation to the support while a bar is being shaped and may be removed from the support with the bar held in position between the presser jaws and forming body.

3. A bar shaping tool including two pivotally united presser jaws; a forming body; and a support for the presser jaws and forming body, the support, the presser jaw structure, and the forming body being provided with structural formations whereby the presser jaw structure and forming body may be held in relation to the support while a bar is being shaped and may be removed from the support with the bar held in position between the presser jaws and forming body.

In witness whereof, I hereunto subscribe my name this 16th day of February A. D., 1910.

LA VERNE W. NOYES.

Witnesses:
L. C. WALKER,
F. L. DOLE.

Copies of this patent may be obtained for five cents each, by addressing the "Commissioner of Patents, Washington, D. C."